Sept. 6, 1949.  W. J. MILLER  2,481,326
METHOD AND APPARATUS FOR MAKING
HIGH-GRADE POTTERYWARE
Filed June 17, 1943  4 Sheets-Sheet 1
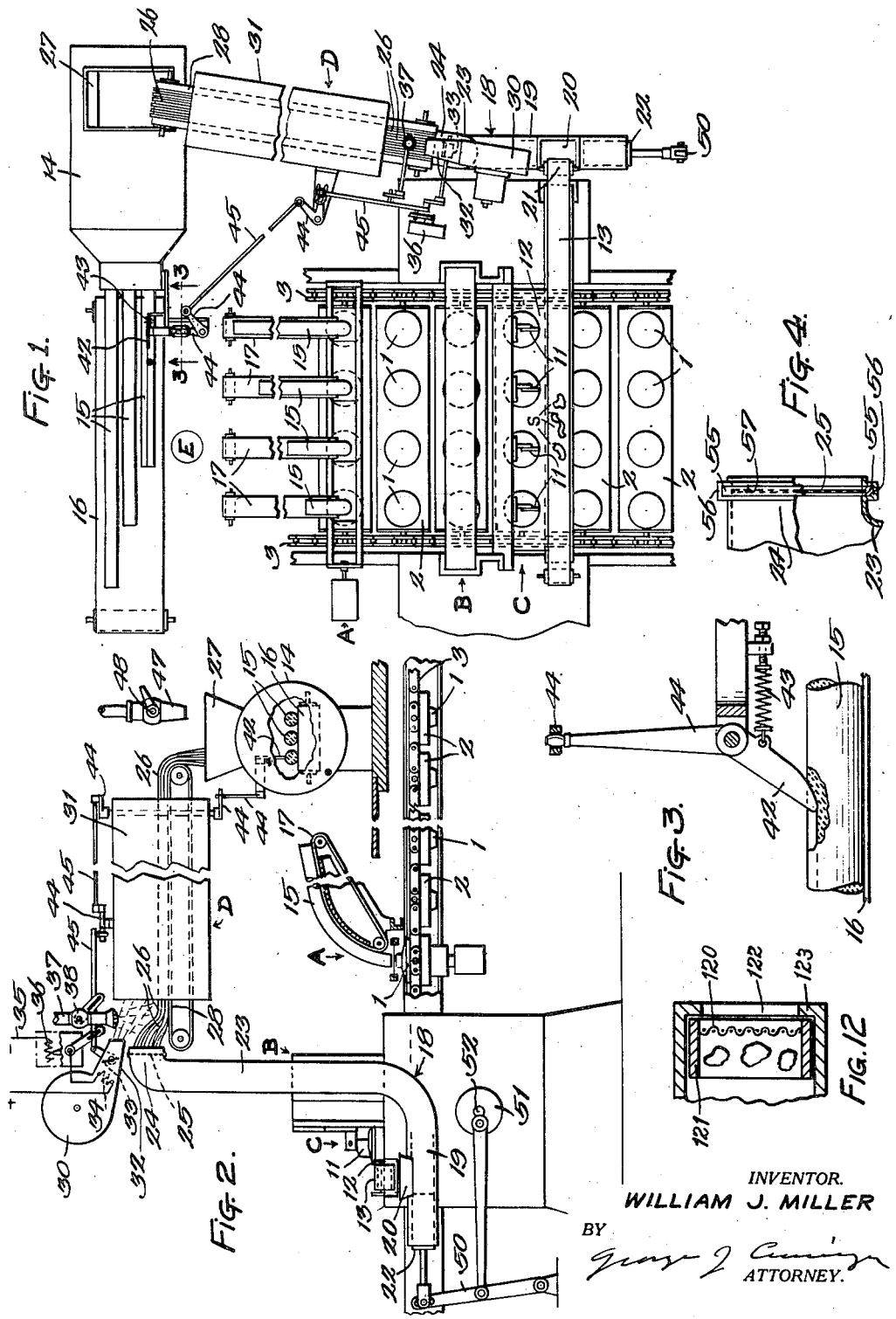
INVENTOR.
WILLIAM J. MILLER
BY
ATTORNEY.

Sept. 6, 1949.　　　W. J. MILLER　　　2,481,326
METHOD AND APPARATUS FOR MAKING
HIGH-GRADE POTTERYWARE
Filed June 17, 1943　　　　　　　　　4 Sheets-Sheet 2
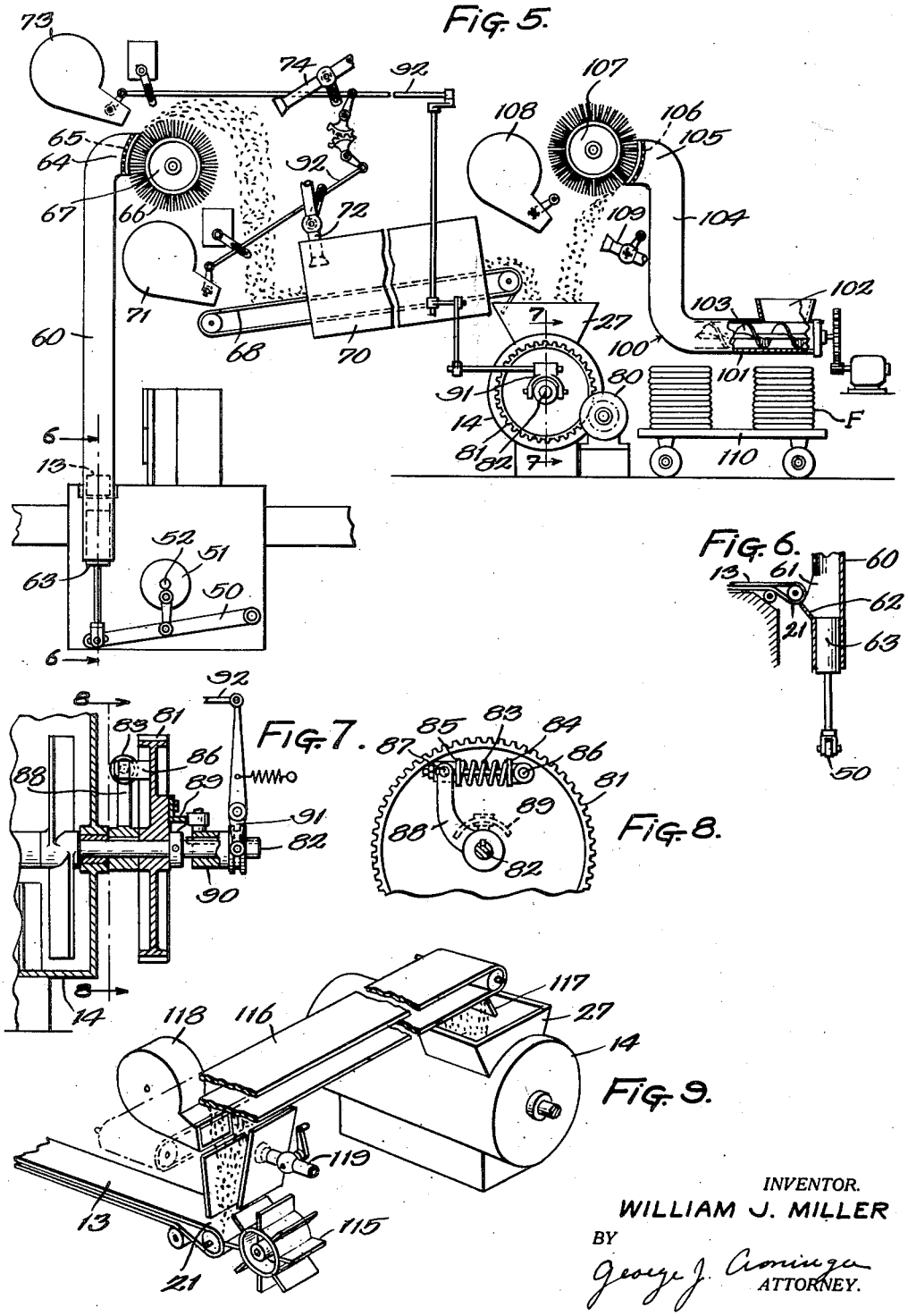
INVENTOR.
WILLIAM J. MILLER
BY
George J. Crominger
ATTORNEY.

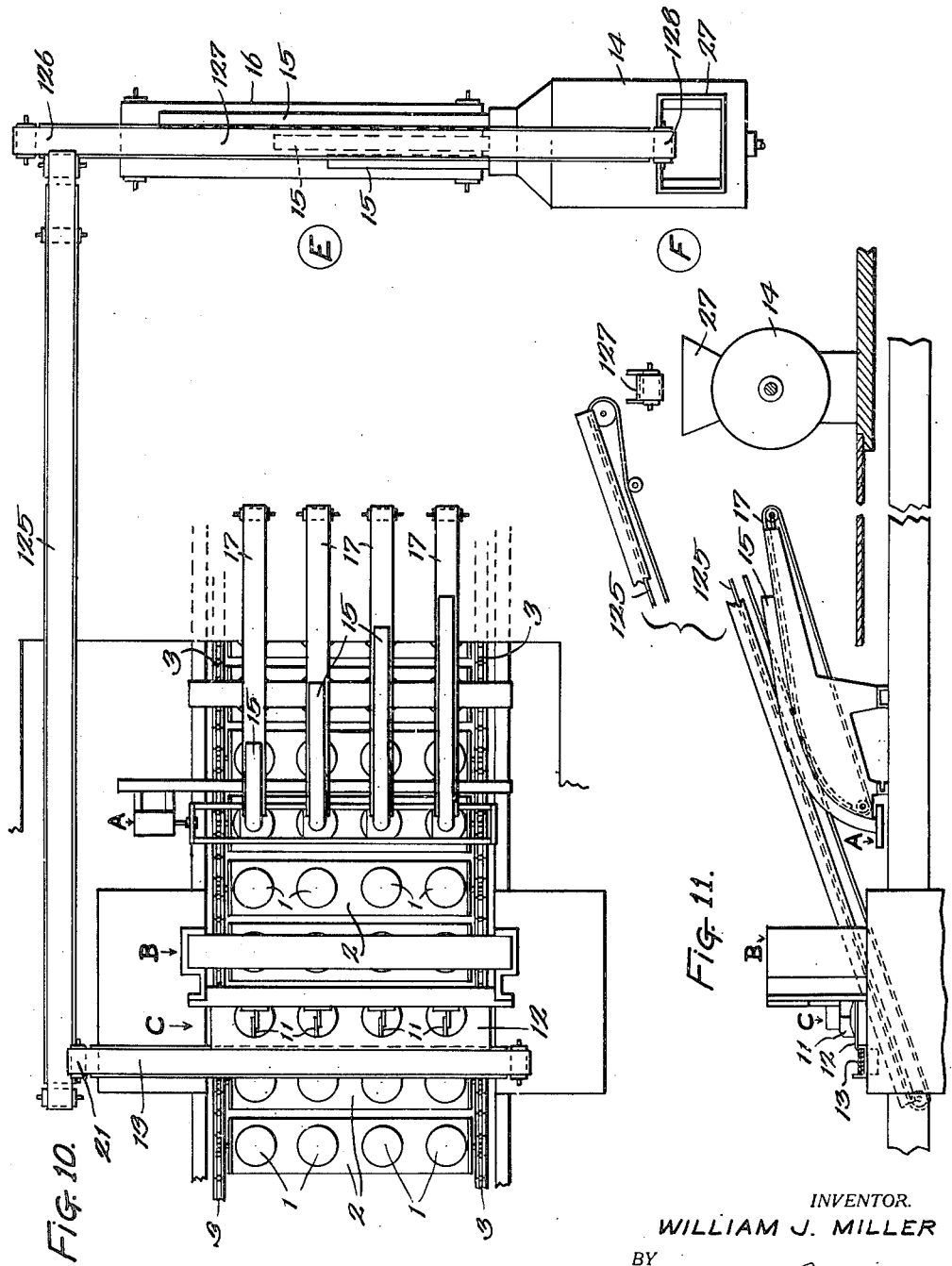

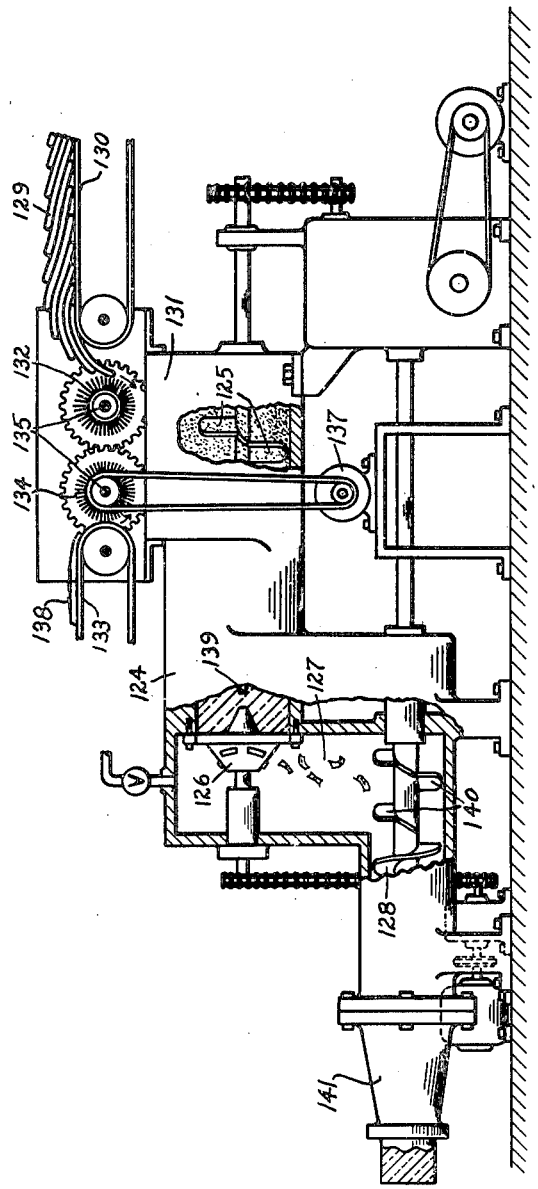

Patented Sept. 6, 1949

2,481,326

UNITED STATES PATENT OFFICE 2,481,326

METHOD AND APPARATUS FOR MAKING HIGH-GRADE POTTERY WARE

William J. Miller, Swissvale, Pa., assignor to Miller Pottery Engineering Company, Swissvale, Pittsburgh, Pa., a corporation of Pennsylvania Application June 17, 1943, Serial No. 491,134

24 Claims. (Cl. 25—22)

This invention relates to methods and apparatus for manufacturing high grade pottery ware, jiggered dinnerware and pressed electrical or thermal fittings from filter pressed plastic clay. It has to do, more particularly, with improved methods and apparatus for processing, conditioning or reconditioning filter pressed and/or scrap plastic clay to improve the molding, drying and firing behavior thereof.

An object of the invention is to facilitate by the simplest and most dependable and efficient low-cost method and apparatus, the production of clay of uniform fine optimum texture, temper, consistency, viscosity and plasticity whereby all pressed or jiggered ware produced therefrom will be of improved quality.

Another object is to improve and consistently maintain production of ware having a higher thermal and mechanical shock resistance value while in actual use.

Another object is to provide a dependable uninterrupted supply of optimum characteristic clay for a multiple of manual presses or jiggers or continuously operating high-speed multiple line automatic pottery production machine (such as disclosed in my Patent 2,046,525) to thereby avoid production interruptions or handicaps and insure maximum production of ware.

Another object is to provide for automatically reconditioning and then blending scrap and filter pressed clay for obtaining an optimum characteristic clay, or employing the scrap and/or filter pressed clay to correct viscosity deficiencies in the normal clay supply, or for use alone for press or jigger forming, and wherein the scrap and/or filter pressed clay will be cleaned and/or restored to proper moisture content without reblunging, screening and filter pressing, as heretofore practiced.

Another object is to purge and otherwise clean detriment adhering material off the scrap prior to deposit in the pug mill and without reblunging and filter pressing it.

A further object is to continuously and automatically salvage and reuse the scrap clay from the ware forming apparatus directly and immediately it is discarded therefrom.

Plastic clay as herein contemplated is usually prepared by mixing raw ceramic materials with water, then filter-pressing out excess water, pugging the filter cakes to homogenize the material and then extruding same, the extrusions being cut up into suitable lengths termed "pugs" for convenient handling and transportation to the jigger or press, there progressively segregated into charges and applied to the mold.

The filter cakes are formed in filter bags into which the clay slip is pumped under substantial pressure through a central inlet, the water passing through the bag fabric and the clay being retained therein. Deposition and dehydration progresses from the bag surface inwardly to the center of the bag and cake, the supply and pressure being maintained until water drip therefrom has decreased to the desired extent, visually determined by the operator. Therefore, the cakes have a mushy center and excessively hard brim zone.

The pug mascerating knives are widely spaced and progress the mass rapidly with insufficient masceration to the auger which extrudes it through the nozzle onto a support in column form. This results in the pugs having zones or lumps of hard and seams or zones of soft clay of varying moisture content, plasticity, viscosity and temper indiscriminately mixed together. Moreover, no two filter cakes or two batches of cakes from successive or simultaneous pressings are exactly alike in these respects. Then again, a batch of filter cakes may be predominately hard or soft depending on the pressure applied, dwell thereof, the consistency of the slip, texture and permeability of the filter bags, time of exposure of the cakes to air while awaiting pugging, action and moisture absorbing value of the contacting air, and other factors.

If the filter cakes are obviously too soft or too hard, the pug operator usually adds that amount of clay of the opposite character which in his judgment should produce optimum viscosity clay. However, hard and soft zones will survive in the issuing slug.

Excessively soft clay slugs predominate generally due to insufficient filter press equipment and/or insufficient pressing dwell by operators working on tonnage production basis or to faulty equipment.

Clay charges taken from these composite pugs do not spread consistently smooth over the molding surface due to hard and soft lumps therein. These lumps are caught and dragged by the jigger tool through the softer clay and thus spoil the ware. Furthermore, during drying and firing, the different co-efficient of shrinkage between the soft and hard clay lumps and lines of juncture or seams, causes cracking and warping of the ware and leaves strains in the ware after firing which lowers its thermal electrical and mechanical shock resistance value.

Optimum plastic clay encompasses optimum troweling or workability characteristics requiring a very fine uniform texture or grain size clay body, plasticized to improve its workability, tenacity and cohesive characteristics through thorough mixing working and troweling as in a pug. It may be of any optimum degree of viscosity or hardness or percentage of water content short of a liquid, but devoid of lumps, zones or seams.

While a manual jiggerman may slightly improve improperly conditioned clay charges by applying thereto additional or abnormal forming steps or technique no such flexibility of operation is practical in die pressing or with automatic jiggering machines, because it is impractical for the machine operator to make frequent required adjustments while attending to, for instance, eight or twelve lines of production, at high speed.

Consequently, it is the lower priced and lower perfection requirement ware that is usually made of such improper consistency clay in order to maintain a low production cost consistent with competitive selling prices.

In making high-priced ware of high-priced quality material, the plastic clay is usually taken from the filter press or pug mill, mauled into a mass and then damp-stored for several weeks or months in a sealed room or cellar before re-pugging and use. This aging somewhat improves the uniformity of temper and plasticity of the clay primarily because it allows moisture to slowly become more uniformly distributed throughout the mass through capillary action. Storing does not correct water content ratio and consequent viscosity, but only distributes the water originally contained therein. While storing improves the workability, drying and firing behavior, it requires considerable storage space and extra labor and also compels the maintenance of a large stock of aging clay, all of which increases cost of production and prices of the ware.

Incident to press and jigger forming from 20 to 35% of the clay is discarded as overflow scrap. Jigger scrap consists of lumps and ribbons of clay enveloped in slurry, too wet for direct deposit in the pug. I prefer to drain and/or purge off this excess moisture prior to reconditioning and deposit in the pug.

Press scrap discarded from hot, oiled press molds is covered with oil and heated, therefore it dehydrates rapidly. I provide for drenching then purging and draining off the oil and excess water and incident thereto restore or raise the water content thereof prior to reconditioning and deposit in the pug. Free oil or slurry in a clay charge will form seams or pockets of abnormal shrinkage co-efficient clay in the ware.

Heretofore, scrap and abnormal viscosity filter clays have been blunged, screened, de-oiled and filter pressed, then pugged. I provide methods and apparatus for eliminating these expensive steps and deliver the clay in optimum condition direct to the pug.

I propose to disintegrate, comminute, tear or shred discarded scrap and/or filter cake clay into very small particles to increase the surface area and reduce the cross-sectional area thereof and thus render same substantially instantaneously responsive to further treatment in applying thereto a moisture modifying medium proportioned automatically to effect the desired degree of uniform viscosity for any given clay or mixtures of clay being processed, and then subject same to pugging. Thus, the clay will be more thoroughly and expeditiously plasticized, as the disintegrated hard and soft zones of clay are very small and already treated and intermingled, then further intermingled and troweled into a uniform optimum plastic state by the pug mill blades to produce a homogenous clay mass of uniform plasticity, temper, textured fineness and viscosity..

In the drawings:

Fig. 1 is a somewhat diagrammatic view in plan of one embodiment of the invention.

Fig. 2 is a side elevation of the apparatus of Fig. 1.

Fig. 3 is an enlarged detail section taken on the section line 3—3 of Fig. 1, illustrating one form of viscosimeter employed.

Fig. 4 is an enlarged sectional detail of the screen structure at the discharge end of the conduit seen in Fig. 2.

Fig. 5 is a side elevation of another form of embodiment of the invention.

Fig. 6 is a detail section taken on the section line 6—6 of Fig. 5.

Fig. 7 is an enlarged detail section taken on the section line 7—7 of Fig. 5.

Fig. 8 is a section taken on the section line 8—8 of Fig. 7.

Fig. 9 is a somewhat diagrammatic view in perspective of another embodiment of the invention.

Fig. 10 is a plan view of another form of the invention.

Fig. 11 is a side view of the apparatus of Fig. 10.

Fig. 12 is a detail in section of another form of means for screening scrap clay.

Fig. 13 is a side elevation, with parts broken away, of a vacuum pug mill illustrative how I propose to feed clay thereto.

The various forms of the invention are shown as they would be incorporated in a multiple line ware production system wherein the molds 1 for the ware are intermittently advanced to the charging, pressing and feeding stations A, B and C (Fig. 1) and then through a drier as they are carried on a succession of trays 2 pivoted at their ends to the chains 3 of a double chain endless conveyor, and wherein the molds are temporarily raised off the trays during the fabricating operations.

Referring to Figs. 1 and 2, when the molds of each tray are co-operating with the jiggers 11 at the station C, the scrap clay removed by the profiles and trimmer wires of the jiggers is deflected over a shelf 12 onto a scrap conveyor 13 from which the scrap clay is returned to the pug mill 14 of the system by the apparatus D of the invention which also properly conditions the clay. The pug extrusions 15 of the pug mill are carried on an endless belt conveyor 16 so arranged transversely of the lines of production adjacent the charging station A whereby an operator standing therebetween as at E, Fig. 1, may break off desired lengths of pug extrusions and conveniently place same on the feed belts 17 of the clay charge feeding units of the system. The fabricating apparatus of the system is partly disposed in a pit below the floor of the pottery with the scrap clay belt 13 arranged at floor level and the belts 16 and 17 and pug mill are disposed at such a height above the floor as to be more convenient for the operator when feeding the pugs of clay.

The salvaging apparatus includes a conduit 18 having a horizontal portion 19 in the upper side of which is an inlet 20 into which is discharged the scrap clay from the discharge end 21 of the scrap conveyor 13. Operating in the conduit portion 19 is a reciprocating plunger 22 which pumps or forces the scrap clay up through a vertical portion 23 of the conduit, having a horizontal discharge end 24 in which is a screen 25 through which the clay is forced to remove foreign matter therefrom such as bits of hard clay, broken trimmer wires and pieces of broken molds. The scrap clay thus leaves the screen 25 in the form of strings 26 or noodles which are conveyed into the hopper 27 of the pug mill by a horizontal endless belt conveyor 28.

Due to the employment of water sprays for lubricating the jiggers during the jiggering operation the scrap clay usually contains an excessive amount of water at least before being exposed to atmosphere for any great length of time. Then again, under certain atmospheric conditions, by the time the scrap clay leaves the screen it may contain an insufficient amount of water.

Therefore, means are provided for regulating the water content of the strings of scrap clay, while on the conveyor 28, proportionately with respect to that of the filter cakes supplied to the pug mill whereby the pug extrusions will be of a predetermined plasticity. To this end, to lower the moisture content of the scrap clay it may be subjected to a current of hot or warm air from a blower 30 and directed through a tunnel or chamber 31 through which the clay is carried on the conveyor 28 at a comparatively slow rate in accordance with the moisture evaporation period required. In the outlet 32 of the blower is a damper 33 for controlling the volume of the air current and an electric heating coil 34 in whose circuit 35 is a rheostat 36 for controlling energization of the coil to regulate the temperature of the air. To raise the moisture content of the scrap clay, it may be sprayed with water from a spray nozzle 37, controlled by a valve 38 and arranged whereby the current of air from the blower will pass through the spray in regulating the humidity of the air in the chamber.

The damper 33, valve 38 and rheostat 36 may be jointly controlled in maintaining the pug extrusions at a predetermined degree of plasticity, by a viscosimeter including a knife-edged finger 42 held, by a spring 43, depressed into the surface of a pug extrusion as it emerges from the mill (see Fig. 3). The damper, valve and rheostat are so operably connected with the finger, by suitable levers 44 and linkage 45, whereby as the finger is deflected from a neutral position as the extrusion offers greater or lesser resistance thereto as the plasticity of the extrusion varies from that predetermined, the proper amount of water will be added to the scrap clay and the volume and temperature of the current of air from the blower will be such as to correct the plastic condition of the extrusion. If further correction or alteration of the plastic condition of the pug extrusions is desired beyond that range made possible by the amount of scrap clay available, a desired amount of clay slip of the proper consistency may be added to the pug mill from a nozzle 47 controlled by a valve 48.

The plunger 22 may be operated in timed relation with the fabricating apparatus of the system through a lever 50 operated by a crank 51 on a shaft 52 which may be considered as the drive shaft of the said apparatus.

The screen 25 may be removably mounted in the conduit discharge end 24 for cleaning or for replacement by being secured in a rectangular frame 55 (Fig. 4) received in opposite guideways 56 of said end with openings 57 in opposite wall portions of the end permitting removal of the screen from one opening by inserting another screen into place through the other opening.

The form of the invention shown in Fig. 5 includes a vertical conduit 60 having a side inlet 61 into which scrap clay from the scrap conveyor 13 is discharged by way of a chute 62 and then forced upward in the conduit by a plunger 63 operating in the lower end of the conduit. The top end of the conduit 60 terminates in a horizontal discharge end 64 in which is a screen 65 formed arcuately about and slightly spaced from the edges of bristles 66 of a rotating brush and impeller 67. As the strings of clay emerge from the screen, the bristles reduce the strings to small pieces or particles and impelled thereover to fall upon a substantially horizontal endless conveyor 68 to be carried thereon and then discharged into the hopper of the pug mill.

In this form the scrap clay may be conditioned by means similar to the first form including a tunnel 70 through which the clay passes on the conveyor 68, a blower 71 which directs a current of hot or warm air through the tunnel and a spray nozzle 72 for spraying water on the particles of clay as they enter the tunnel. In addition to conditioning the clay while on the conveyor 68, it is also contemplated to condition same while suspended in air between the brush and the conveyor for the reason that the clay particles will then present maximum surface area to the conditioning media so that each particle will be more uniformly conditioned throughout its entire mass in a comparatively short period of time. For this purpose, as the clay particles are impelled over the brush 67, they may pass through a current of warm or hot air from a blower 73 and/or then be sprayed with water from a valved nozzle 74 in varying the moisture content of the clay.

The blowers 71 and 73, duplicates of the blower 30, and the valved nozzles 72 and 74 are jointly controlled by a viscosimeter responsive to variations in the plastic condition of the clay in the pug mill. For this purpose (see Figs. 5, 7 and 8), the pug mill is driven by a motor 80 through speed reducing gearing including a gear 81 rotatable on the pug mill shaft 82 and driving same through a coiled compression spring 83 cooperating between abutments 84 and 85 pivoted respectively, at 86 and 87, on the side of the gear and the end of an arm 88 keyed to the shaft.

When a change occurs in the plastic condition of the clay in the pug mill from that predetermined, the gear 81 will shift angularly with respect to the arm 88 as the increased or decreased torque requirement of the pug mill shaft in forcing the clay through the pug dies causes the spring 83 to compress or relax. When the gear is so shifted, the blowers 71 and 73 and nozzles 72 and 74 will be regulated to correct the plastic condition of the clay by means of a cam 89 on the gear, a sleeve 90 in sliding key connection with the pug mill shaft and actuated by the cam, a lever 91 actuated by the sleeve and linkage 92 co-operating between the dampers and rheostats of the blowers and the valves of the nozzles. However, the blower 73 and nozzle 74 may also be arranged for manual control in varying the temperature and volume of the current of air and the amount of water required to compensate for any abnormal or subnormal plastic condition of the fresh clay supply beyond the range of correction made possible by the blower 71 and nozzle 72.

To compensate for any reduction in the normal range of correction made possible by the scrap clay conditioning apparatus due to an insufficient amount of scrap clay available, and at the same time promote thorough mixing of the scrap clay with fresh clay, it is contemplated to process the fresh clay in meeting such requirements. The processing means may include a conduit 100 having a horizontal clay receiving end 101 into which the filter cakes may be fed through a hopper 102, with a rotating feed screw 103 in said end which somewhat mascerates the cakes and progresses same up through an upward extension 104 of the conduit which terminates in a horizontal discharge end 105. As the fresh clay is discharged from said end 105, it passes through a screen 106 and then is cut into small particles by a rotating brush 107 so arranged to impel the particles into the hopper of the pug mill. The means for regulating the moisture content of these fresh clay particles may constitute a duplication in whole or in part of that employed for the scrap clay, wherein the means, at least, may include a blower 108 and a valved spray nozzle 109 comprising duplicates of the blower 30 and nozzle 37 arranged to direct a current of heated air or a spray of water onto the particles as they fall into the pug mill.

As seen in Fig. 5, the clay receiving portion 101 of the conduit 100 may be so located that an operator may remove the filter cakes from a truck, such as indicated at 110 usually employed, and conveniently feed the cakes into the hopper 102 of said portion.

In another form of the invention, as seen in Fig. 9, the scrap clay may be discharged off the discharge end of the conveyor 13 into the path of the blades of a cutter 115 similar to the brush 67, which cuts up the scrap into small particles and impels same upward to adhere to the underside of a horizontal endless conveyor 116. The clay particles are then conveyed to a scraper 117 arranged over the hopper of the pug mill to scrape the clay off the conveyor and cause same to fall into the hopper.

As the clay particles are impelled upward by the cutter, they may be subjected to a current of hot air from a blower 118 to reduce the moisture content thereof, or subjected to a spray of water from a valved nozzle 119 to increase the moisture content thereof, with said blower and nozzle being regulated by a viscosimeter as employed in the other forms of the invention.

A simplified form of scrap clay salvaging apparatus is shown in Figs. 10 and 11 designed to return the scrap to the pug mill without conditioning same and wherein the apparatus employed will not present a hazard in the way of the operator as he shifts at certain intervals from the location E to a position F adjacent the pug mill in order to conveniently feed the filter cakes thereto. For this purpose, the discharge end of the scrap conveyor 13 is disposed at the side of the lines of production opposite that of the location of the pug mill. As the scrap clay is discharged from the conveyor 13, it is transported to the pug mill by way of an inclined endless belt elevator 125 co-operating between the discharge end of said conveyor and the receiving end 126 of a horizontal belt conveyor 127 which extends across the lines of production to a discharge end 128 disposed over the hopper of the pug mill.

Obviously scrap from manual jiggers or presses as discarded or periodically as accumulated may also be conveyed to and passed through either conditioning apparatus prior to pugging or filter cakes or scrap exclusively employed. Also, the cakes or scrap may be treated or preconditioned prior to passing through the said apparatus.

The term "direct" used in the claims to describe the return of excess or scrap clay from the fabricating machine to the plug mill means that the material goes back to the pug mill without being blunged or filter pressed again.

Fig. 12 shows another form of non-clogging device for screening the clay wherein the screen 120 is carried by cylindrical sleeve 121 of smaller diameter than the inside diameter of the pipe. The aperture 122 in the pipe end is smaller in diameter than the screen thereby providing a flange 123 against which the screen rests when clay is being forced therethrough. If the screen clogs, clay escapes around the perimeter of the sleeve 121 and extrudes through aperture 122 as a hollow column to thereby indicate the clogged condition of the screen and the need for cleaning out the same.

Fig. 13 shows a vacuum pug mill 124 of conventional design being fed with clay by my improved method.

In conventional operation, the knives 125 serve to cut the filter cakes into various size lumps in a hit miss fashion then mix these with the mushy portions and plasticize the intervening softer portions, thereafter by means of the shredder 126 slice or shred the mass including the lumps into smaller portions to expose a greater surface area to the influence of sub-atmosphere within the chamber 127 and then without further mixing or plasticizing, extrude the mass through an auger 128 designed to progress the mass with a minimum of helical movement; turbulence, mixing or plasticizing action.

Consequently, the hard and soft slices retain their shape, viscosity and plasticity and although not arranged as previous to slicing, the lumps reduced in size, the mass still contains hard and soft portions which when formed into thin articles such as tableware may extend completely therethrough and break or warp the article during drying and firing. Also its plasticity or troweling and forming tenacity characteristics have not been improved, nor optimum characteristic clay produced.

I propose to deliver filter cakes 129, laid flat in overlapping relation as shown on a conveyor belt 130 direct from the filter presses to the hopper 131 of the pug mill. Here, the cakes are comminuted as they overhang the end of the conveyor by the action of a rapidly rotating wire brush 132 mounted on the hopper frame, of appropriate width, and bristle size and strength to consume the filter cakes fed thereto at a rate commensurate with the demand of the pug mill. The clay is torn by the brush into small particles which are thrown in a continuous stream downwardly (see arrows) into the open top hopper, there to be acted upon by the pug mill knives. If it is desired to also feed scrap clay or to feed a plurality of streams of clay into the hopper, one or more additional belts as represented by belt 133 and brush 134 may be provided in which case the brush shafts 135 could be geared together and driven by a single motor 137. For purposes of illustration, strings of scrap clay 138 are shown on belt 133 being fed to brush 134 thus resulting in the comminuting of said strings and the intermingling thereof with the shreddings torn from the filter cakes. The pug mill knives mix these shreddings together whose reduced particle size compels a better and more uniform textured clay in the extrusion which is forced by auger 139 through the rotating shredder 126 to again comminute the clay in the presence of vacuum. The clay shreds fall to the floor of the vacuum chamber where the knives 140 remix the material which is ultimately extruded by auger 128 through the extrusion nozzle 141 in the form of a column of clay of uniform temper, texture and plasticity due to the double comminuting and mixing and the fact that at least one of the streams of clay has been treated for uniform moisture content before entering the pug. In this connection, the belt 133 may operate in conjunction with the automatically controlled moisture modifying chamber previously described and the pug mill extrusion may be tested for hardness in the manner previously mentioned, in controlling the operation of the chamber.

Through my method of first reducing the cake to the smallest practical particle size, then further mixing and reducing the particle size through abrasive and deforming action of the particles against each other within the pug, I obtain a clay having a uniform minimum particle size or texture and the increased abrasive and sliding action between particles has increased the distribution of the adhesive ingredients such as clay and kaolins over the surfaces of the hard aggregates such as spar and flint thus effect maximum bonding area and lubricant between aggregates to effect maximum tenacity, workability, mechanical strength during and after drying and firing and also less shrinkage during firing and drying because the relative shrinkless aggregates are in closer contact and the mass is devoid of concentrated bonding and aggregate zones or pockets. During filter pressing, the slip is quiescent within the bag for several hours during which the heavier aggregates settle to the lower edge of the vertical positioned disclike filter bag and the lighter adhesives rise to the upper portion thereof. Thus the predominately aggregate composition portion would be termed (short) or lacking in plasticity and tenacity and shrinkage and the upper portion the reverse thereof. Obviously a conventional vacuum pug cannot redistribute these very fine aggregates and adhesives as above outlined.

I claim:

1. The method of preparing filter cakes for fabrication which comprises, comminuting said filter cakes in the plastic state prior to initial pugging, modifying the moisture content thereof whilst in the comminuted state, then pugging the comminuted material and extruding the same in the form of a column to be sub-divided into charges and made into jiggered potteryware.

2. The method of preparing filter cakes for fabrication which comprises, comminuting said comminuted plastic ceramic material prior to filter cakes in the plastic state prior to initial pugging, modifying the moisture content of said pugging, pugging the comminuted material, compressing the same into a homogeneous mass, comminuting the compressed material, de-airing the same and extruding it, the extrusion to be subdivided and made into ware.

3. In the manufacture of jiggered dinnerware and the like from plastic ceramic material, the method which comprises, comminuting prior to initial pugging masses of plastic filter pressed clay containing a greater amount of moisture than required for jiggering, applying heat to the comminuted material in an amount and degree sufficient to remove the excess moisture and reduce the material to a plastic condition suitable for pugging, and then pugging the material, extruding the same and cutting from the extrusion bodies of material to be formed into potteryware.

4. The method of preparing filter cakes for fabrication which comprises, comminuting scrap plastic clay received from fabrication, adding moisture thereto or abstracting moisture therefrom to develop the proper degree of hardness or softness for mixture with fresh filter pressed clay and thereafter pugging the treated scrap clay with fresh filter pressed clay to provide a mixture suitable for fabrication into ware.

5. In the manufacture of potteryware, the method which comprises, pugging scrap plastic clay and fresh clay together, extruding the mixture and subdividing the extrusion into mold charges and making ware therefrom and pugging the scrap plastic clay produced incident to fabrication with fresh clay after first cleaning the scrap clay of foreign material and removing excess moisture therefrom if too soft or adding moisture thereto if too hard for mixture with the fresh clay.

6. In the manufacture of potteryware, the method which comprises, continuously accumulating the scrap plastic clay produced incident to ware fabrication and transporting the same direct to a pugging station and there pugging the same with fresh clay, extruding the mixture, subdividing the extrusion into charges and making ware therefrom, the scrap clay from such fabrication being accumulated and pugged with fresh clay as aforesaid, the process being carried on continuously.

7. The method of preparing filter cakes for fabrication which comprises, pugging filter pressed clay whose moisture content varies with scrap clay whose moisture content is predetermined and automatically varied according to the moisture content and viscosity of the mixture.

8. In apparatus for manufacturing potteryware, an automatic jiggering machine, a pug mill for supplying plastic clay thereto, and means for returning scrap plastic clay from the jiggering machine to the pug mill having means associated therewith for comminuting the scrap plastic clay.

9. In apparatus for manufacturing potteryware, an automatic jiggering machine, a pug mill for supplying plastic clay thereto, and means for carrying scrap plastic clay from the jiggering machine to the pug mill having associated therewith means for comminuting the scrap clay and means for modifying the moisture content thereof.

10. In apparatus for manufacturing potteryware, an automatic jiggering machine, a pug mill for supplying clay thereto and means for carrying scrap plastic clay from the jiggering machine to the pug mill having means for comminuting the scrap, means for modifying the moisture content thereof and means for cleaning the scrap clay associated therewith.

11. In apparatus for manufacturing potteryware, the combination which comprises, ware fabricating machinery, a pug mill for supplying said machinery with plastic clay to be subdivided into mold charges and made into ware, and means for returning scrap plastic clay produced incident to fabrication from the fabricating machinery direct to the pug mill having associated therewith means for abstracting moisture from the clay.

12. In apparatus for manufacturing potteryware, the combination which comprises, ware fabricating machinery, a pug mill for supplying said machinery with plastic clay to be subdivided into charges and made into ware, means for returning scrap plastic clay from the fabricating machinery direct to the pug mill for pugging with fresh clay, means for shredding the scrap clay before it is introduced into the pug mill and means operable to modify the moisture content of the shredded clay prior to pugging.

13. In apparatus for manufacturing potteryware, the combination which comprises, potteryware fabricating apparatus, clay pugging means, means for returning scrap clay from the fabricating apparatus direct to the pugging means, means for conditioning the clay prior to pugging including clay comminuting means and means for modifying the moisture content thereof and means responsive to changes in hardness of the clay acted on by the pugging means, when varying from a predetermined value, for actuating said conditioning means.

14. The combination with ware fabricating apparatus and clay pugging means, of means for returning excess or scrap plastic clay from the fabricating apparatus direct to the pugging means, means for conditioning the clay while being returned including a plurality of controllable devices for applying different fluid conditioning media to the clay, and means responsive to the hardness of the clay acted on by the pugging means when varying from a predetermined value for jointly controlling said controllable devices.

15. The combination with clay pugging means, of means for feeding clay to the pugging means, and means for conditioning the clay while being fed including a screen and means for forcing the clay therethrough to remove foreign matter therefrom, a rotating comminutor arranged to cut the clay extrusions from the screen into small particles and impell same through air, and controllable means for applying fluid conditioning media to the clay particles while being impelled.

16. The combination with a pugging means, of apparatus for feeding clay thereto including an overhead conveyor, means for shredding and forcefully propelling the shreddings against the underside of the conveyor to become stuck thereto by the inherent adhesiveness thereof, means for modifying the moisture content of the shreddings and means for scraping the shreddings off the conveyor to be deposited in the inlet of the pugging means.

17. In combination, a clay pugging device, means for feeding clay to the pugging device, controllable means for conditioning the clay while being fed thereto, and means responsive to the hardness of the clay extrusion of the device when varying from a predetermined value for controlling said conditioning means including a reaction member and means yieldably holding the same inmebbed in the extrusion as it is discharged from the device.

18. In combination with apparatus for fabricating potteryware of a pug mill for preparing the clay supplied to the fabricating apparatus, means for conveying the scrap clay produced by the fabricating apparatus to the filling opening of the pug mill arranged to elevate the scrap material to the level of said opening and means for comminuting the scrap material prior to entering the filling opening of the pug mill.

19. In apparatus for manufacturing jiggered dinnerware and the like, an automatic jiggering machine and means for supplying said jiggering machine with a mixture of scrap plastic clay and fresh filter pressed clay including a pug mill having an inlet, conveying means for fresh filter pressed clay arranged to discharge the clay into the inlet, means associated therewith for comminuting the fresh filter pressed clay, conveying means arranged to receive scrap plastic clay from the jiggering machine and carry it back to the pug mill from the jiggering machine and discharge it into the inlet and means associated therewith for modifying the moisture content of the scrap clay.

20. In apparatus for manufacturing jiggered dinnerware and the like, an automatic jiggering machine and means for supplying it with a mixture of scrap plastic clay and fresh filter pressed clay including a pug mill having an inlet, conveying means for fresh filter pressed clay arranged to discharge clay into the inlet, conveying means arranged to receive the scrap plastic clay from the jiggering machine and carry it back to the pug mill and discharge it into the inlet, means associated with each conveying means for comminuting the clay and means associated with each conveying means for modifying the moisture content of the clay.

21. In apparatus for manufacturing jiggered dinnerware and the like, an automatic jiggering machine and means for supplying it with a mixture of scrap plastic clay and fresh filter pressed clay including a pug mill having an inlet, conveying means for fresh filter pressed clay arranged to discharge clay into the inlet, conveying means arranged to receive the scrap plastic clay from the jiggering machine and carry it back to the pug mill and discharge it into the inlet, means associated with each conveying means for comminuting the clay and means associated with each conveying means for modifying the moisture content of the clay together with means, operable in response to variations in the plasticity of the clay discharged by pug mill for varying the operation of the moisture modifying means.

22. In the manufacture of jiggered dinnerware, the method which comprises, pugging masses of fresh filter pressed clay with comminuted scrap plastic clay and controlling the plasticity of the pugged mixture by varying the moisture content of the scrap clay.

23. In the manufacture of jiggered dinnerware and the like, the method which comprises, comminuting the filter cakes in the plastic state before the material is initially pugged and thereafter adding comminuted scrap plastic clay thereto and pugging the two materials together.

24. In the manufacture of jiggered dinnerware and the like, the method which comprises, comminuting the filter cakes in the plastic state before the material is initially pugged, thereafter adding comminuted scrap plastic clay thereto and pugging the two materials together, comminuting the pugged mixture, deairing it and extruding the deaired mixture.

WILLIAM J. MILLER.

(References on following page)

REFERENCES CITED

The following references are of record in the file of this patent:

UNITED STATES PATENTS

| Number | Name | Date |
| --- | --- | --- |
| 338,465 | Bayer et al. | Mar. 23, 1886 |
| 1,769,530 | Miller | July 1, 1930 |
| 1,850,939 | Miller | Mar. 22, 1932 |
| 1,879,367 | Latz | Sept. 27, 1932 |
| 1,898,381 | Mooney | Feb. 21, 1933 |
| 1,987,359 | Brown | Jan. 8, 1935 |
| 2,023,426 | Lasley | Dec. 10, 1935 |
| 2,336,734 | Jellinek | Dec. 14, 1943 |

OTHER REFERENCES

Ceramic Industries—by Bourry; published by Scott, Grenwood & Son, London, 1911; "Rolling and Pugging Combined," page 89.